No. 649,685. Patented May 15, 1900.
F. G. AVERILL.
WEEDER AND CULTIVATOR.
(Application filed Aug. 29, 1899.)
(No Model.) 2 Sheets—Sheet 1.
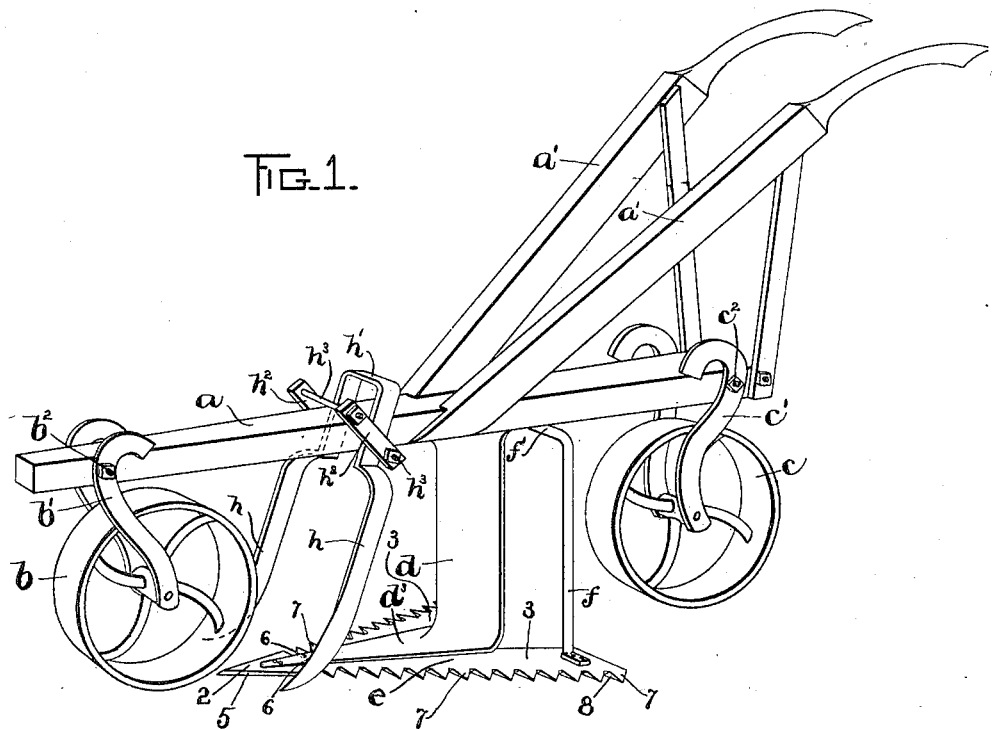
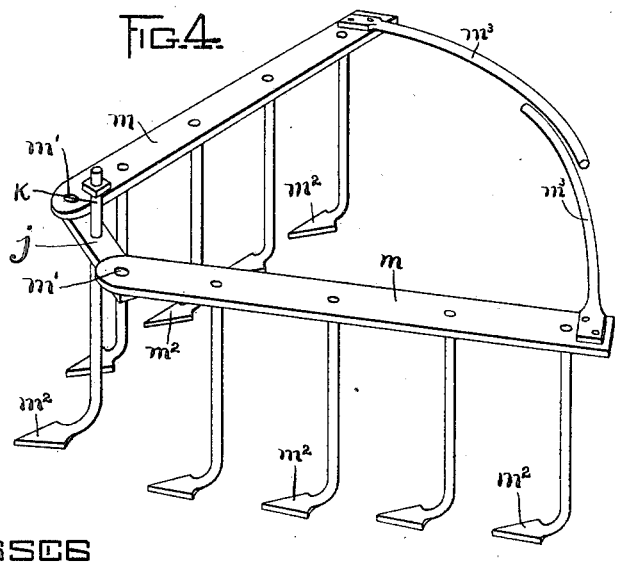
WITNESSES
E. Batchelder
R. H. Pierson
INVENTOR:
F. G. Averill,
By Wight Brown Quimby
Attys No. 649,685. Patented May 15, 1900.
F. G. AVERILL.
WEEDER AND CULTIVATOR.
(Application filed Aug. 29, 1899.)
(No Model.)
2 Sheets—Sheet 2.
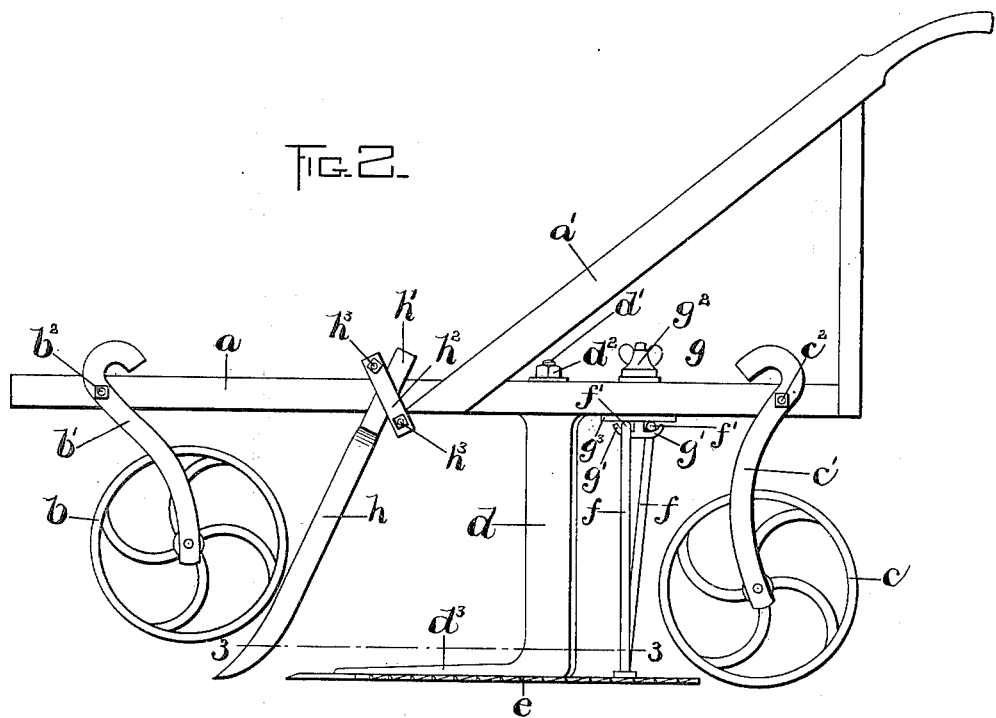
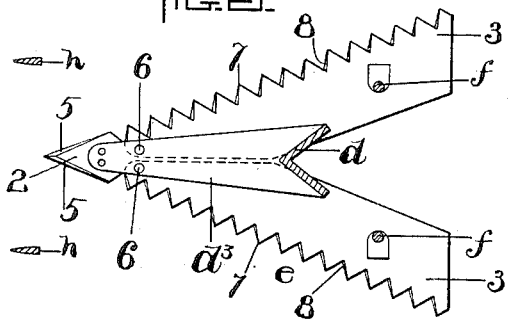
WITNESSES:
E. Batchelder
R. M. Pierson
INVENTOR:
F. G. Averill
By Wright Brown & Quimby
Attys

UNITED STATES PATENT OFFICE.

FRANCIS G. AVERILL, OF HAMPDEN, MAINE.

WEEDER AND CULTIVATOR.

SPECIFICATION forming part of Letters Patent No. 649,685, dated May 15, 1900.

Application filed August 29, 1899. Serial No. 728,842. (No model.)

*To all whom it may concern:*

Be it known that I, FRANCIS G. AVERILL, of Hampden, in the county of Penobscot and State of Maine, have invented certain new and useful Improvements in Weeders and Cultivators, of which the following is a specification.

This invention has for its chief object to provide an improved device for cutting weeds below the surface of the ground.

It also has for its object to provide an implement which can be adapted for use either as a weed-cutter or a cultivator.

The invention consists in the improvements which I will now proceed to describe and claim.

Of the accompanying drawings, forming a part of this specification, Figure 1 represents a perspective view of my improved weed-cutter. Fig. 2 represents a side elevation of the same. Fig. 3 represents a section on line 3 3 of Fig. 2. Fig. 4 represents a perspective view of a cultivator adapted to be applied to the frame of the machine shown in Figs. 1 and 2.

The same letters and numerals of reference indicate the same parts in all the figures.

In the drawings, $a$ represents the longitudinal beam, having the handles $a'$ $a'$. The beam is provided with the adjustable front wheel $b$ and the adjustable rear wheel $c$. Said wheels may be connected to the beam $a$ by any suitable means which will permit their vertical adjustment, so that the depth of the horizontal weed-cutter next described may be regulated. I have here shown the wheels journaled in arms $b'$ $c'$, which are secured to the beam $a$ by means of bolts $b^2$ $c^2$, having nuts which may be tightened to hold the arms at any desired angle, the height of the wheels being varied by swinging the arms on the bolts. Any other suitable means may be used for this purpose.

$d$ represents a standard attached by a bolt $d'$ and nut $d^2$ to the beam $a$. Said standard is preferably V-shaped in cross-section, as shown in Fig. 3, and has a horizontal foot $d^3$ formed on its lower end, said foot projecting forward from the standard and having a flat bottom surface. The foot is made as thin as possible, and its upper surface is formed to move under the surface of the ground with as little resistance as possible. To the foot $d^3$ is affixed a horizontal weed-cutter $e$, adapted to move horizontally with the foot under the surface of the ground and to cut off the roots of weeds, the depth of the cutter below the surface of the ground being determined by the wheels $b$ $c$.

The weed-cutter is preferably composed of three plates or sections 2 and 3 3. The section 2 is riveted or bolted rigidly to the front end of the foot $d^3$ and is a thin triangular plate sharpened at its two forward edges 5 5, Fig. 3. The sections 3 3 are thin elongated plates pivoted at 6 6 to the foot and having V-shaped teeth 7 7 on their outer edges, the front edges 8 of the teeth being sharpened. The points of the teeth are substantially in line with the sharpened edges of the section 2, and the three sections constitute a substantially-triangular cutting-blade adapted to move below the surface of the ground and sever any weed-roots that the cutting edges encounter. The cutting edges of the teeth 7 are arranged so nearly at right angles with the direction of movement of the device when it is in operation that they act to cut the weeds squarely without pushing them sidewise.

The pivotal connection of the sections 3 3 with the foot $d^3$ enables the said sections to be adjusted to vary the distance between their rear ends, so that the weeder can be readily adapted to the distance between the rows of plants. To hold the sections 3 3 at any position to which they may be adjusted, I provide the rear ends of the sections with arms $f$, having horizontal upper portions $f'$, which are of segmental form and extend inwardly in opposite directions across the under side of the beam $a$.

$g$ represents a clamp on the beam, composed of a bolt having hooks $g'$ $g'$ on its lower end adapted to bear on the segmental portions $f'$, the bolt passing through the beam and having a nut $g^2$ at its upper end. When the nut is screwed forward, the bolt is raised and the hooks $g'$ caused to clamp the portions $f'$ against a metal plate $g^3$ on the under side of the beam. In case it is not desirable to provide for the adjustment of the width of the weed-cutter the sections 3 3 may be rigidly attached to the foot $d^3$.

$h$ $h$ represent knives attached to the beam $a$ in position to cut vertically into the ground in advance of the horizontal weed-cutter and score the ground at opposite edges of the path cut by the said horizontal cutter, thus enabling a clean path to be cut having well-defined edges. The knives $h\ h$ are connected by a bent yoke $h'$, which bestrides the beam $a$ and is secured thereto by a clamp composed of plates $h^2$ and bolts $h^3$.

The operator, after adjusting the wheels $b\ c$ to regulate the depth of the horizontal cutter $e$, operates the device by pushing it along between the rows of plants, the preferred way being to alternately push the device forward and draw it back a shorter distance when the weeds are abundant, although in some cases the forward movement may be continuous.

Owing to the fact that the horizontal foot $d^3$ is made thin and has a substantially horizontal upper surface as well as under surface, to the latter of which the thin horizontal weed-cutter plates are connected, there is no portion of the implement which is adapted to travel below the surface of the ground, having an inclined surface. Therefore there is no tendency of any part of the implement to disturb the adjustment of the wheels $b\ c$. This enables a simple adjusting device to be employed, such as the bolts $b^2\ c^3$, which adjust the distance of the wheels from the beam simply by tightening the nuts upon said bolts.

In Fig. 4 I show a cultivator attachment which may be substituted for the cutter $e$ and knives $h\ h$, said parts, with the standard $d$, being removed from the beam.

The cultivator comprises a short cross-piece $j$, having an upwardly-projecting bolt $k$, adapted to enter an orifice $k'$, formed for its reception in the beam $a$, and two bars $m\ m$, pivoted at $m'\ m'$ to the cross-piece $j$ and provided with cultivator-teeth $m^2$ and with inwardly-projecting segmental arms $m^3\ m^3$, adapted to be engaged and held by the hooks $g'\ g'$ of the bolt $g$, the width of the cultivator being therefore capable of adjustment. When the cultivator is attached to the beam, the wheel $b$ is moved forward to clear the front end of the cultivator.

I claim—

1. A weeding implement or device comprising a beam having handles, front and rear wheels adjustably connected with the beam, a standard attached to the beam and having a substantially-horizontal foot adapted to move below the surface of the ground, a horizontal weed-cutter composed of the pointed front section 2 affixed rigidly to the foot, and the toothed adjustable sections 3 3 pivoted to the foot, and means for holding the said adjustable sections at any positions to which they may be adjusted.

2. A weeding implement or device comprising a beam having handles, front and rear wheels adjustably connected with the beam, a standard attached to the beam and having a substantially-horizontal foot adapted to move below the surface of the ground, a horizontal weed-cutter composed of the pointed front section 2 affixed rigidly to the foot, and the toothed adjustable sections 3 3 pivoted to the foot, arms $f\,f$ affixed to the adjustable sections and having segmental horizontal portions, and a clamp on the beam adapted to engage and hold said segmental portions.

3. A weeding implement or device comprising a beam having handles, front and rear wheels adjustably connected with the beam, a standard attached to the beam, a horizontal weed-cutter secured to the lower end of the standard, said cutter having toothed cutting edges diverging from the forward end of the cutter, and vertical scoring-blades affixed to the beam and projecting downwardly at opposite sides of the center of the horizontal cutter.

4. An implement of the character specified, comprising a beam having handles, adjustable wheels, an orifice $k'$ near the front end of the beam, and a clamping device near the rear end thereof, said beam having intermediate provisions for holding a horizontal weed-cutter, while the orifice $k'$ and the clamping device enable a cultivator attachment to be used interchangeably with the said weed-cutter.

In testimony whereof I have affixed my signature in presence of two witnesses.

FRANCIS G. AVERILL.

Witnesses:
B. W. HARDY,
W. H. TRIBOU.